Dec. 26, 1967 J. A. POTTER 3,360,062
SCALE FOR MEASURING CHANGE OF WEIGHT OF CLINICAL PATIENT
Filed Dec. 14, 1964
3 Sheets-Sheet 1
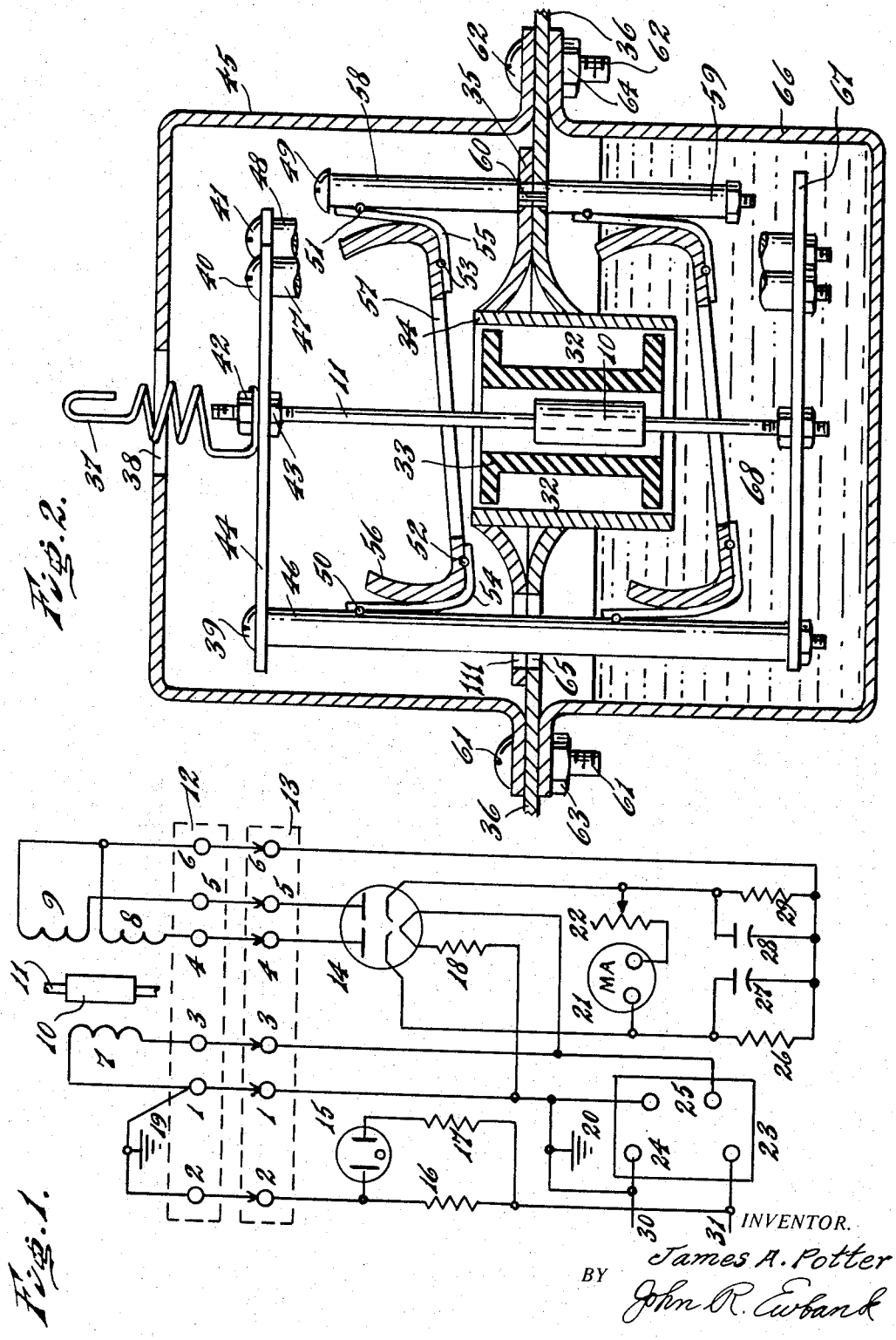
INVENTOR.
James A. Potter
BY
John R. Ewbank
ATTORNEY Dec. 26, 1967 J. A. POTTER 3,360,062
SCALE FOR MEASURING CHANGE OF WEIGHT OF CLINICAL PATIENT
Filed Dec. 14, 1964 3 Sheets-Sheet 2

INVENTOR.
James A. Potter
BY John R. Eubank
ATTORNEY

Dec. 26, 1967  J. A. POTTER  3,360,062
SCALE FOR MEASURING CHANGE OF WEIGHT OF CLINICAL PATIENT
Filed Dec. 14, 1964  3 Sheets-Sheet 3
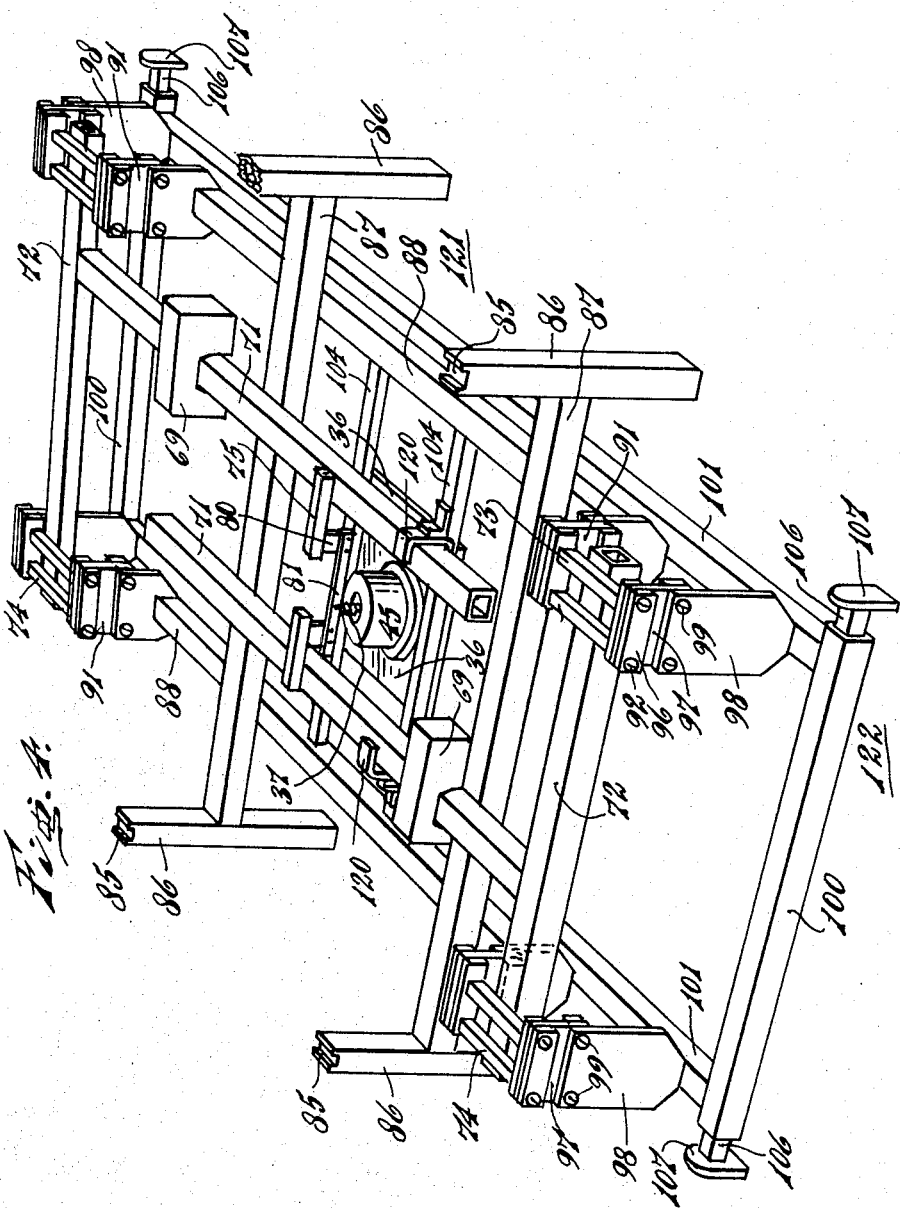
INVENTOR.
James A. Potter
BY
John R. Ewbank
ATTORNEY United States Patent Office 3,360,062
Patented Dec. 26, 1967

3,360,062
SCALE FOR MEASURING CHANGE OF WEIGHT
OF CLINICAL PATIENT
James A. Potter, 12 Greenhouse Blvd.,
West Hartford, Conn. 06110
Filed Dec. 14, 1964, Ser. No. 417,928
11 Claims. (Cl. 177—144)

This application is a continuation-in-part of Serial No. 346,630, filed February 24, 1964, now Patent 3,224,518, the disclosure of which is incorporated herein by reference. Four patents, 3,259,821, 3,272,936, 3,283,599, and 3,283,605 were compulsory divisions of said parent 3,224,518.

This invention relates to methods and apparatus for measuring, indicating and recording changes in weight of a patient undergoing clinical examination. The term "clinical" is employed to embrace the work done by psychologists, veterinarians, physicians, and others concerned with observing physiological phenomena by observing changes of weight during a reasonable period of time such as from ten minutes to a week.

In applications of weighing scales requiring successive measurements of the change in loadweight over an extended period of time it is expedient to leave the scale assigned to a single load, so that each load requires a separate scale for the duration of the series of measurements. In such installations a number of scales are typically required, so that the cost of each installation is high. There has been a long-standing demand for weight change measurements by less expensive approaches toward achieving reasonable sensitivity and stability of repeated readings at a reasonable cost.

Heretofore linear variable differential transformers have been employed to modulate an electrical signal in amounts proportional to the magnitude of linear displacement imposed upon moveable magnetic cores within the transformers. Because designs for using such transducers must adequately solve problems of: suitably interconnecting the member whose motion is to be measured with the transformer core; restricting the lateral motion of the core by means having negligible frictional forces opposing longitudinal motion; viscous damping to suppress oscillation of members in motion; and suitable electrical circuitry for remote indicating and recording of the displacement, instruments relying upon differential transformers as transducers have generally been quite expensive.

There has been a persistent need for reasonable cost and reasonable complexity in weighing scales which will manifest reliable measurements of weight changes small relative to the total weight upon the scale. In such weighing it is important that the values indicated and recorded for such changes in weight be repeatable within specified accuracy over protracted periods of elapsed time. The problems of attaining the requisite degree of freedom from drift are aggravated in typical instances by reason of the heaviness of the containers and frames supporting the loads whose weight changes are of interest. The scale for such a load is customarily rated high enough in capacity to accommodate such excessive tare loads so that its sensitivity and stability for measuring relatively small changes in weight is inadequate. Further, the bulkiness of the scale structures so applied has interfered with their convenient usage because of the space they require beneath the load. In weighing scales, as well as in other applications of motion transducers, there has been a long-standing need for floormounted structures compact enough to fit under equipment such as beds, tables, and tanks and short enough in overall height from the floor to clear low-hanging parts in the equipment being measured. Such weighing scale must be sufficiently rigid and stable. The whole system must constitute a simply operable, drift-free-measuring device requiring adjustment or maintenance on only rare occasions.

Methods are known for controlling the body fluid balance in a hospital bed patent by means of ovservations of change in the patent's weight. However, difficulties have been encountered in using prior art means of observing changes of the patient's weight due to the fact that such patients are bedridden. Some devices of prior art require that the patient be moved to a stretcher equipped with a manually balanced weighing scale, and either allowed to remain upon the stretcher throughout the series of measurements, or repeatedly moved on and off the stretcher for each measurement. The disadvantages of moving the patient have discouraged surgeons and physicians from using scales for repeated weighings of the patient. Hence more cumbersome, indirect methods of controlling body fluid have sometimes been used. This need for observing changes in body weight of a bedridden patient has led to the development of scales to fit beneath a hopsital bed and support its four legs.

However, the hospital bed scales described in previous literature and/or previously used have had disadvantages such as high initial cost, complexity of operation, and difficult maintenance. Some previous hospital bed scales have had inaccuracies greater than the increments of weight change significant to the physician in controlling the patient's body fluid balance. Among the undesirable performance characteristics contributing to inaccuracy in the period art is the variability of readings in response to moderate changes in environmental temperature. Another is variation of readings with normal, moderate variations in commercial power service voltages. Further inaccuracies appear in prior art devices simply due to elapsed time and are referred to as drift. In administration to the needs of a patient to control his body weight the aggregate of such inaccuracies, if the physician were to rely upon the scale readings, gross errors would be made in treating the patient.

The various features of the present invention cooperate to limit inaccuracies of a scale adapted to measure the weight of a patient undergoing clinical observation. The scale of the present invention is relatively economical in initial cost as well as reliable and stable. Moreover, it is convenient to use in service. Insensitivity to changes in environmental temperature, and stability during prolonged series of measurement are achieved in the present invention by reason of the intrinsic nature of the invention, so that separate adjustments and compensating devices are not required as means of limiting drift. The features of my invention are employed to accomplish the many functions which heretofore: either have been achieved by repeated adjustments of relatively expensive apparatus or else have been unfulfilled.

In one embodiment of the present invention a floor-mounted framework supports a scale lever system, a weighing scale which transmits through wires to remote indicators and signals proportional to the changes in weight upon the weight frame. The invention is applicable for many kinds of weighing, particularly for various loads having four legs, such as work tables and tank understructures but is best described in connection with observation of change of weight of clinical patient. The features of this invention when so used demand a minimum of attention for installation and operation, and do not interfere with the simultaneous usage of the hospital bed.

In the use of a weight monitoring scale for a patient in a hospital bed the bed and patient are balanced or tared on the scale so that at the beginning of the clinical observation, or zero time, the milliammeter indicator is at an appropriate point. Different scales are designed for different sensitivities, extreme sensitivity being necessary for rapidly measuring basal metabolism. At zero time, the scale is tared or balanced so that the indicator of the milliammeter can show a change of weight with time. Thereafter, the normal metabolism in the patient causes a weight loss of milligrams per minute, and the rate of weight loss can permit an accurate measure of basal metabolism during a brief period such as ten minutes if the scale is designed for this sensitivity. Most clinical studies concern weight changes during a period such as from a few hours to a few days, requiring a sensitivity range of about 4 kg. for adult patients or about 400 grams for pediatric patients. In a healthy patient the normal food and beverage intake and various excrements do not take the indicator of the milliammeter to the extremes of the scale even during a period of a week, but if kidney malfunction or asthma leads toward fluid accumulation, the weight monitoring detects the magnitude of the abnormality more promptly than weight otherwise be recognized. The monitoring of weight also permits earlier detection of abnormal weight loss, and this detection is especially helpful in caring for infants and other non-communicative patients.

The accompanying drawings disclose two illustrative embodiments clarifying the principles of my invention:

FIG. 1 is an electrical circuit schematic diagram illustrating the circuit components and interconnections between them.

FIG. 2 is a mechanical drawing showing a partial side view in cross section of the dashpot unit for the scale.

FIG. 4 is a perspective view of a scale featuring certain modifications of FIGS. 1–3 and omitting unnecessary details.

Figure 3:
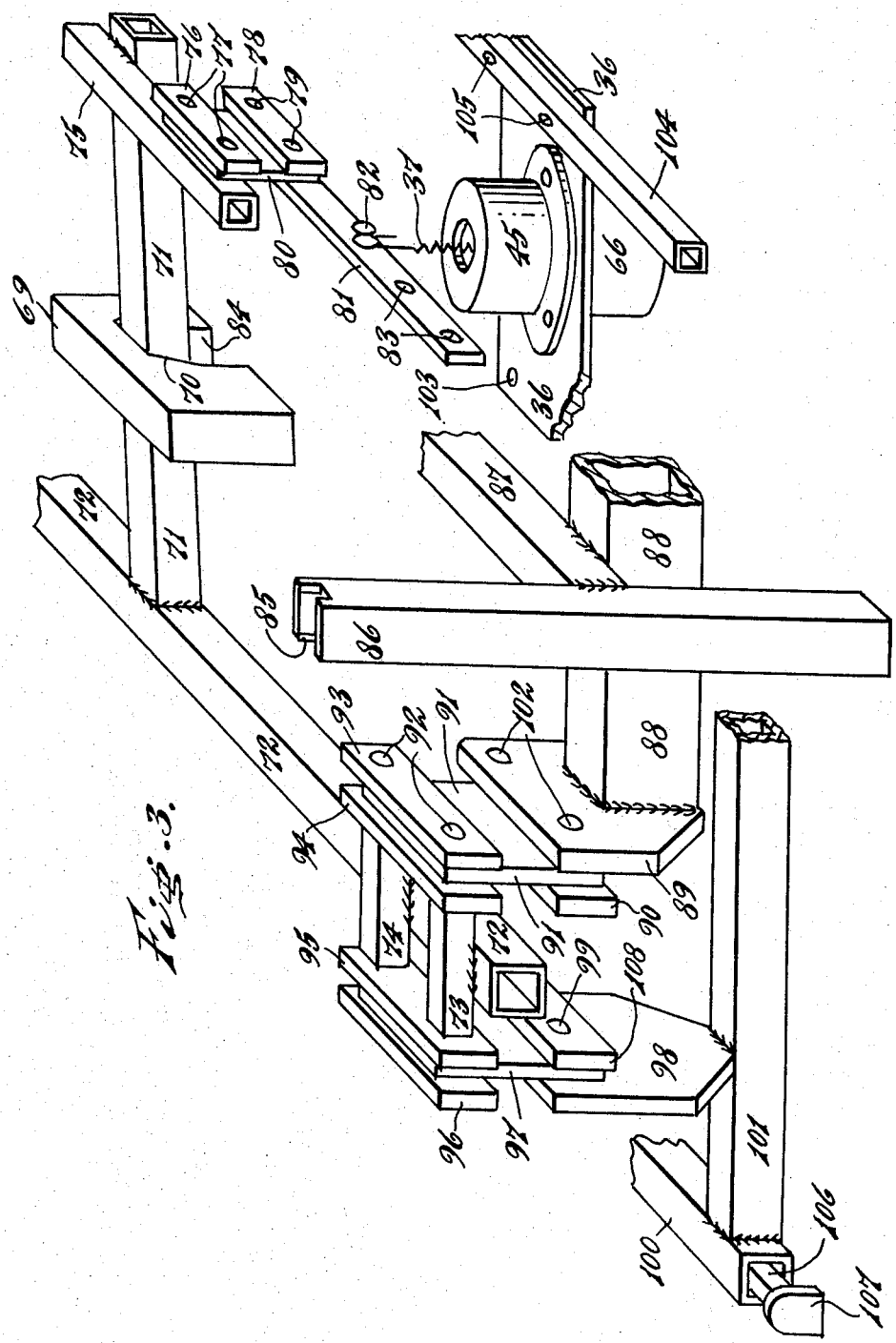
FIG. 3 is a perspective view of some of the more important parts of one of the four corners of a hospital bed weighing scale. Some parts are cut away, and other parts are omitted to avoid repetitious portrayal of like or mirror-image parts.

As shown in FIGS. 1–3, the change of weight of the patient and bed pushing down on supports 107, flexes suspension plates 97 and supporting columns 97, thus twisting torque tubes 72 to raise or lower the ends of the two levers 71 within the range permitted by restraining bumpers 120, thereby moving summation bar 81 vertically up or down. The weight pressure transmitted from supports 107 to summation bar 81 is transmitted through spring 37 to a transducer sending an electrical signal to a remote indicator. In the illustrated embodiment, a differential transformer is the species of transducer. The spring 37 moves up and down in response to changes in the weight of the patient, thus moving armature 10 up and down the vertical axis of secondary windings 8 and 9 of a differential transformer. The electrical signal from the windings 8 and 9 of the differential transformer is converted into a direct current signal by a tube 14, and directed to a milliammeter 21. Appropriate resistances 26, 29 and condensers 27, 28 are shunted across the milliammeter 21.

The drawings illustrate generally that a base 121 includes legs 86 associated with cross members 87 and longitudinal members 88. At the central portion of the rectangular base 121, bars 104 connect the longitudinal members 88. A plate 36 secured to the bars 104 positions the transducer in the base 121.

Four supports 107, adapted to engage the bottom of a hospital bed, are interconnected by a rectangular weighing frame 122 consisting of a pair of longitudinal members 101 and a pair of cross members 100. The rectangular weighing frame 122 of the supports 107 is associated with the rectangular frame of the base 121 through supporting columns 91 and suspension plates 97, providing rugged flexure springs at the four corners. As the changes of weight on the supports 107 flexes the four flexure spring systems at the corners of the two rectangular frames, torque tubes 72 at the ends (in the illustrated embodiment) rotate a fraction of a degree, thus raising or lowering the ends of levers 71, which are interconnected through a summation bar 81, which thus moves vertically up or down.

Support systems for scales generally must be rugged enough to withstand a contemplated sudden shift of load which is only a few times the expected sensitivity of the scale. One unique problem of monitoring the weight of a patient is that the contemplated shock impact is more than a thousand, and in some situations more than a million times the desired sensitivity of the scale. Attention is called to the rugged restraining bumpers 120 permitting the lever arms 71 (and thus the entire weight shiftable system comprising supports 107, cross members 100, longitudinal members 101, summation bar 81, etc.) to move only within the range corresponding to the range of the armature 10 along the vertical axis of the coils 8, 9 of the differential transformer.

Attention is also called to the large slenderness ratio of the suspension plates 97 and supporting columns 91, whereby remarkably high sensitivity is achieved without jeopardizing the ruggedness of the scale. Because the angular flexure of the four flexure springs at the corners of the rectangular frames are so remarkably tiny, extremely high sensitivity is attainable notwithstanding the ruggedness for withstanding the shocks of a patient turning and tossing in bed.

Reference is now made to FIG. 1 to describe an illustrative embodiment of the electrical system.

Commercial two-wire alternating current power service is connected at line leads 30 and 31; and line 30 is grounded. The hot side of the line, lead 31, is connected to the junction of resistors 16 and 17 and the commercial power service is supplied to voltage regulating transformer 23 at its input terminals 24. Current flowing through resistor 17, typically rated one-half watt and in the range of a few thousand to a few million ohms, also flows through neon glow lamp 15 and terminals 2 in connectors 12 and 13 and returns to ground through terminals 1 in connectors 12 and 13. To this current flowing terminals 2 is added the current through resistor 16 typically in the range of several thousand to several hundred thousand ohms. Neon glow lamp 15 serves as a pilot lamp, and its illumination indicates that the system is operative. If the power service voltage decreases lower than a suitable magnitude, or if it fails, or is disconnected, the pilot lamp will be extinguished, and so indicate that the system is out of service. Further use of the pilot lamp is made to indicate that the connectors 12 and 13 are properly joined in readiness for service by reason of the path of lamp current through terminals 1 and 2. Whenever the connectors are parted the glow of the lamp will be extinguished to indicate that the system is out of service; and this indication will be effected even though the power service remains applied at lines 30 and 31. Resistor 16 performs the function of a bleeder load which dissipates stray leakage currents when the connectors are parted which might otherwise produce sufficient voltage at the terminals of lamp 15 to cause it to give a false indication.

The load terminals 25 of voltage regulating transformer 23 supply a relatively constant voltage to energize primary winding 7 and the heater element of thermionic tube 14. Those skilled in the art may vary their designs while following the principles of my invention by selecting any one of several kinds of voltage regulating transformers as item 23, and they may specify any voltage rating for output at terminals 25 consistent with the selections they make for the ratings of winding 7 and the heater in 14. However, the preferred embodiment of the invention calls for a voltage rating within the range of 5.5 to 6.5 volts regulated to within 1% of the rated voltage. Current from terminals 25 flows through resistor 18, typically several ohms and several watts in rating, so that a moderately reduced voltage appears at the terminals of the heater of thermionic tube 14. This feature of reduced voltage prolongs the life of the tube, but the amount of voltage applied to the heater is sufficient to maintain the required emission from the cathodes in tube 14.

Items 7 through 11 together represent a linear variable differential transformer, familiar to those skilled in the art; and its windings are connected to cooperating circuit elements by way of terminals 1, 3, 4, 5 and 6 in male connector 12 through their respective like-numbered terminals in female connector 13. The lead wires connecting to these terminals are preferably grouped into multi-conductor cables, and such cables can total any length in the range of a few inches to thousands of feet, so that the linear differential transformer may be located remote from the other circuit elements in FIG. 1 by the distance permitted by the cable length. The mechanical bearing and supporting means for the linear variable differential transformer elements 7 through 11 are disclosed later in this description by reference to another figure.

The secondary windings 8 and 9 are connected in series opposing, and their common connection is also the common connection for one terminal of each of resistors 26 and 29 and capacitors 27 and 28. The thermionic vacuum tube 14 contains two separate diode configurations one associated with each of the two windings 8 and 9. The left-hand diode in 14 serves as a rectifier of the voltage from winding 8 to impose a direct current into resistor 26 and a DC voltage across the terminals of capacitor 27. The right-hand diode in 14 serves as a rectifier of the voltage from winding 9 to impose a direct current into resistor 29 and a DC voltage across terminals of capacitor 28. The capacitors 27 and 28 are connected in series opposing so that the voltage appearing across their positive terminals is the difference voltage between their two terminal voltages, and this difference voltage is the source of current flowing through microammeter 21 and rheostat 22. An essential principle of my invention is that the direct current in microammeter 21 causes a deflection in its indicating pointer proportional to the axial displacement of core element 10. A record of various magnitudes of displacement of element 10 can be had by employing a recording microammeter at 21. An intrinsic feature of the invention is that while the rheostat 22 is primarily intended to permit calibration adjustments to attain close correspondence between the indications manifested by microammeter 21 and the magnitude of linear displacement of core element 10, its temperature coefficient of change of resistance with ambient temperature changes is negative in commercially available rheostats so as to compensate in the indicated values at 21 for the tendency of the positive temperature coefficient of resistivity of the conductors in windings 7, 8 and 9 to produce unwanted deviations of the indication in response to ambient temperature changes. The negative temperature coefficients of resistivity of resistors 26 and 29 further contribute to the intrinsic insensitivity of indicated displacement motion to ambient temperature changes.

Microammeter 21 may be selected in the range of a few microamperes to a few thousand microamperes; but the preferred embodiment calls for a zero-center instrument giving full scale deflection either side of zero for 100 microamperes. When used to indicate changes in weight the scale of microammeter 21 can be labelled at full-scale, if appropriate design is employed throughout the system, for weight change magnitudes from about 10 milligrams to about 10 kilograms. When my invention is employed as a weighing scale for adult patients being observed for fluid balance the preferred label for the scale of microammeter 21 is two kilograms each side of zero. Such control of the sensitivity of the scale is achieved predominantly by the thinness of the supsension plates 97 and supporting columns 91, normally installed at the factory in compliance with the sensitivity specifications of the physician requesting the scale. Appropriate modifications of electrical components to meet the needs of the specified application are also possible. Resistors 26 and 29 are typically equal to each other in the range of ratings at one-half watt at resistance values in the range of a few hundred ohms to a few megohms. Capacitors 27 and 28 are typically approximately the same and are rated 50 DC working volts and between 10 and 10,000 microfarads. The values of capacitors 27 and 28 and 26 and 29 may be selected to secure a desired degree of damping and sluggishness in the readings by reason of the time constant resulting from such selection.

The components and wiring shown in FIGURE 1 below connector 13 are preferably mounted together in compact enclosure displaying on its front panel the microammeter 21 indicating face, the pilot lamp 15, and the adjustment knob for rheostat 22. A cable extending from the enclosure for the ammeter to the connector 13 can be attached to the male connector 12, which may for example be mounted so that its terminal prongs extend through a hole in the dashpot cover 45 illustrated in FIGS. 2 and 3. The mechanical mounting of the connectors 12 and 13 is not illustrated herein, but may be accomplished in one or another way familiar to those skilled in the art.

The description is now continued by reference to FIG. 2. Nonmagnetic through rod 11 supports magnetic core piece 10 within winding spool 33, a cross sectional view of which is illustrated. Windings 7, 8 and 9 (illustrated only in FIG. 1) are contained in winding space 32 on spool 33. The spool and the windings are contained in and supported by cylindrical shell 34. Plate 44 and disc 67, the edges of which are shown in FIG. 2, are held approximately parallel to and spaced apart from one another by cylindrical spacers 46, 47 and 48 and their respective through-bolts 39, 40 and 41. Through rod 11 is threaded at both ends, and nuts on these threads are tightened to secure it and the core 10 fastened to it so that they become the axial members of a cage-like structure held relatively rigid by its other members, namely, plate 44, disc 67, cylindrical spacers 46 and 47 and 48, and bolts 39, 40 and 41 with their tightened nuts. At the top of the cage-like structure nuts 42 and 43 on through-rod 11 serve to fasten the lower end of coiled spring 37 to the plate 44 so that the structure is suspended from the spring. The vertical motion to be measured is applied at the top hook of spring 37, and the motion is transmitted by way of the spring to rod 11 and core 10. The central holes in plate 44 and disc 67 through which rod 11 passes are substantially larger in diameter than the diameter of the rod, so that core 10 may be properly centered within spool 33 before the nuts on rod 11 are fully tightened during manufacture.

The outer shell 34 of the linear variable differential transformer is held in position by forced fit through holes in plate 36 and plate 35. Plate 35 is clamped to and supported by plate 36 by three bolt-and-spacer assemblies, only one of which is illustrated.

The assembly illustrated consists of cylindrical spacers 58 and 59, together with through bolt 49 and its nut. In the FIG. 2 illustration the shaft 60 of bolt 49 is shown passing through clearance holes in plates 35 and 36, while the lower end of spacer 58 and the upper end of 59 are pressed toward each other by reason of the tension in shaft 60, so that plates 35 and 36 are securely clamped against one another.

In addition to the functions already described for cylindrical spacers 46 and 58 it is essential to the functioning of this embodiment of my invention that they also serve to fasten flexible strips 54 and 55 at points 50 and 51 to spacers 46 and 58, respectively, and to cooperate with bearing member 56, which is illustrated in cross-sectional view. Although as few as five bearing members such as item 56 can be employed and many might be appropriate in some contemplated instances, the preferred embodiment contains six such bearing members. FIG. 2 shows only two of these, and the upper one of these, namely, item 56 is described herein, together with its cooperating means and parts, to represent the function of all of the other five similar bearing members. The right-hand and the left-hand surfaces of bearing member 56 are shaped so as to approximately conform to a cylindrical surface whose axis of curvature nearly intersects and is approximately at right angles with the axis of rod 11. Bearing member 56 is suspended in operating position by means of flexible strips 54 and 55 fastened at points 52 and 53, respectively. A large clearance hole 57 is provided in bearing member 56 so that its vertical motion will not bring it into contact with centrally-located parts of the assembly. Flexible strips 54 and 55 so overlay the cylindrical surfaces of bearing member 56 that they not only support it, but also provide its bearing surfaces against the lateral restriction of the opposing parts of the surfaces of spacers 46 and 58, respectively. By cooperation of all of the bearing members like item 56 with each other and with their associated supporting and restricting parts, the core 10 is restricted in lateral, horizontal motion, but is allowed vertical motion with very little opposing friction. Flexible strips 54 and 55 are thin enough so that their flexing introduces a negligible amount of friction, and the opposing forces due to this flexure are largely counteracted by reason of the fact that vertical motion which causes further bending of one of strips 54 and 55 at the same time causes unbending of the other. Clearance holes 65 and 111 in plates 36 and 35, respectively, are provided for vertical movement of spacer 46 without restriction of rubbing friction. Clearance holes are provided for spacers 47 and 48 and serve a similar purpose, but do not appear in the illustrations.

Dashpot cover 45 is secured to plate 36 by means of screws 61 and 62; and its upper, relatively flat surface contains a centrally located hole 38 to provide unrestricted clearance for spring 37. Cover 45 serves the additional purposes of securing electrical connector 12 (not illustrated in FIG. 2) and generally protecting the mechanism within from dirt and foreign objects. Cylindrical pot 66 is secured as a cover over the lower part of the mechanism by means of screws 61 and 62 and their respective nuts 63 and 64, and serves the additional function of containing damping fluid 68. Disc 67 operates as a dash-pot cylinder in fluid 68, and is restrained from touching the sides of pot 66 by action of the bearings previously described for maintaining alignment of core 10.

The whole of FIG. 2 represents a vertical motion transducer, the vertical motion being introduced at the upper end of springs 37, and the electrical modulation being produced in windings contained the cylindrical space 32. The support of the transducer is accomplished by securing plate 36 to bars 104 or any other convenient part of base 121 or other supporting structure in the installation.

Further description of the bed weighing scale follows, and reference is made to FIG. 3. Leg 86, and three other similar legs not shown carry the weight of the whole assembly and suspend it clear of the floor. Cross-member 87 is butt-welded to the side of leg 86, and its other end is welded symmetrically to the side of the opposite leg so that the two legs and the cross-member 87 comprise an H-shaped frame. A like H-shaped frame, not shown, consists of the two other legs and a cross-member like 87. Longitudinal member 88 is welded to cross-member 87 near one of its ends, and to the other cross-member near its other end, not shown. The rectangular frame of the base 121 is thus supported by legs 86. The left-hand half of FIG. 3 illustrates one corner assembly, and since the other four corner assemblies are closely similar they are not shown and only partially described in order to avoid needless repetition. Plate 89 is welded to the end of longitudinal member 88 so that its sides are approximately vertical, and normal to the axis of the longitudinal member 88 of the base 121. Bolts 102 pass through plate 89, supporting column 91 and keeper bar 90, and these bolts are drawn home by tightening their nuts, not shown, so that the lower portion of supporting column 91 is very tightly clamped between the upper portion of plate 89 and keeper bar 90. The upper part of supporting column 91 flexure pivot is clamped between keeper bars 93 and 94 by bolts 92 which extend through tubes 73 and 74; and these two bolts extend further, through keeper bar 95, suspension plate 97 and keeper bar 96. Nuts, not shown, draw the keeper parts and supporting column and suspension plate just mentioned tightly against the ends of tubes 73 and 74 when tightened upon the threads of their bolts 92. Each of the thin springs designated as supporting column 91 and suspension plate 97 functions as a flexure pivot, and it is the design of the scale so that these flexure pivots are rugged enough to withstand impulse shocks of great magnitude but flexible enough to bend throughout the range corresponding to the range of movement of the armature 10 relative to differential transformer cores 8 and 9 in response to the desired range of weight measurement (e.g. 10 mg., 2 kg., 10 kg. etc.) which helps to achieve the remarkable results at low cost. Tubes 73 and 74 are welded to torque tube 72. The lower portion of suspension plate 97 is clamped between keeper bar 108 and the upper portion of plate 98 by means of bolt 99 and another bolt not visible in the illustration. The lower end of plate 98 is welded to longitudinal member 101, which is butt-welded to cross-member 100. The welded assembly consisting of two longitudinal members represented by item 101, two cross-members represented by 100, and four plates represented by item 98 is the weigh frame 122 and need be only moderately rigid. Each of the weigh frame corners presents a open end of a horizontal tube, as shown in FIG. 2 for the end of tube 100. Telescoping member 106 can be moved freely in and out of the end of tube 100, so that the support 107 welded to it can be adjusted to match the location of the leg of the bed to be received as a load.

Torque tube 72 and tube 75, both welded to lever arm 71 together comprise a scale lever. Bolts 77 through keeper bar 76 and flexure pivot 80 clamp the upper portion of flexure pivot 80 tightly against the side of tube 75; and the lower portion of the flexure pivot 80 is clamped between keeper bar 78 and bar 81 by means of bolts 79. Another flexure pivot corresponding to item 80 and not shown is clamped against the other end of bar 81 by means of a keeper bar and bolts not shown, which bolts pass through holes 83. The upper portion of this later flexure pivot is associated with another lever assembly which extends to the other two corner assemblies of the bed-weighing scale. Bolt 82 through bar 81 secures the upper end of spring 37, so that any movement of bar 81 carries the end of the spring with it. In this way the vertical motion of the bar 81 is transmitted through the spring 37 into the vertical motion transducer. FIG. 3 shows the dashpot cover 45, pot 66 and plate 36 secured in place by bolts 105 and other bolts not shown, one of which passes through hole 103 in plate 36. Bar 104 and a similar bar not shown in FIG. 3 are the supporting members for the vertical motion transducer, and they are welded to the central portions of the longitudinal members 88.

Counterbalance weight 69 has an opening extending upward from its lower surface. Item 84 is the tip of a hook-like protrusion of the far interior side of weight 69 and contacts the bottom of lever arm 71. An opposing slanting surface 70 on the near portion of the weight 69 at its interior is forced against the corner of the lever arm 71 by the off-centre weight of item 69, and the result is that the weight 69 is locked into position on the lever arm 71. To unlock the weight requires only lifting the near end; and it can be slid along the lever arm 71 to a new position and will lock itself when it is released.

The upper ends of the legs are indented in a saddle-like groove, as illustrated by groove 85 in the top of leg 86. The lower ends of the legs may be equipped with rolling casters or furniture glides to facilitate movement along the floor. This arrangement of the legs is especially adapted to hospital beds which have means for extending and retracting their legs. To place the subject bed scale invention in service, the hospital bed legs are extended to raise the bed proper upward from the floor sufficiently for the scale to be centered beneath it.

The four supports 107 must be pushed inward so as to telescope item 106 into the end of cross tube 100; and when all four of the other load receiving supports 107 are thus pushed inward, clearance is made between the bed posts and the corners of the bed-weighing scale. With the bed thus centered over the scale the bedposts are made to retract so that the bed rails seat into grooves 85 of legs 86; and further retraction of the bed posts will lift them from the floor while the bed is supported upon the tops of the scale legs. After the bed legs have been fully retracted, load receiving support 107 and the other three like it are pulled outward to positions under the retracted bed posts or under projections of parts near the bottoms of the bed posts. Thereupon the bed posts are extended, and move downward to meet their respective load receiving members; and after they have done so further driving downward will lift the bed from its position of rest upon the tops of the scale legs and cause the bed to be fully scale-borne upon the weigh frame 122. The weight bearing upon the bed legs received by load receiving support 107 and the other three like members adds to the weigh frame weight and comprises the total load hung from the four suspension plates 97. The tension force thus caused in suspension plate 97 causes a corresponding torque in torque tube 72. The effects of this torque, and the corresponding torque from the other end of the scale, are mechanically added together at bar 81, and their net effect is sensed through the vertical displacement of the upper end of spring 37.

In preferred embodiments of the invention the degree of flexing of the mid-portions of the flexure pivots at the four corners, comprising supporting columns 91 and suspension plates 97 are restricted by means of limiting bumpers 120 secured to the floor-supported base 121 and so located as to be contacted by the upper and lower sides of lever arm 71. As shown in FIG. 4, these bumpers 120 may extend vertically from crossbars 104 to restrict the range of movement of the entire scale by restricting the movement of lever arms 71. Thus the range of vertical movement of the weigh frame 122 is restricted to the range of vertical movement accurately measured by the coils 8, 9 of the differential transformer.

A preferred method of using the invention to measure and record changes in weight of a bed patient will now be described with the aid of references to various items illustrated in the accompanying drawings. The patient may remain in the hospital bed while the scale is being placed under it as described in the foregoing, or may be put into the bed afterwards, as prescribed by the physician. Before the series of measurements is started, the enclosure containing the part of FIG. 1 below the connector 13 is fastened to the bedstead and adds to the total tare weight upon the scale; or, as an alternate means of mounting it may be positioned at a remote location such as the desk of the section nurse. After the system has been energized by connecting the power service voltage to input lines 30 and 31, and after connectors 12 and 13 have been joined, the system is ready for initial balancing by means of one or more shiftable tare weights such as weight 69. Gross steps in balancing torque change may be had by adding or removing weights from lever arms represented by item 71; and small steps in balancing may be had by moving any one of the weights axially along its lever arm. Neither the amount of balancing weight nor the position of the various weights along the lever arms need be known for use of the scale. The attendant setting the initial balance may do so by observing the effect his manipulation of the balance weights has upon the indication manifested on the face of microammeter 21. As soon as an on-scale reading is available at microammeter 21 small steps of balance adjustment may be made to cause the initial indication to appear at any desired point on the scale. However, it is usually preferable to set the initial balance to present a zero indication, at the center of the scale, so that either gains or losses in weight will traverse the central part of the indicating scale on microammeter 21. No further adjustment is needed to place the system in operation for taking a series of readings of changes in weight upon the scale. If no extraneous changes in weight are made, such as placing objects upon the bed or removing them from it, the changes in indicated weight are a close measure of the change in weight of the patient. If no changes are made in the balance adjustment, the series of readings will give a history of weight variation of the patient against elapsed time.

In normal operation the changes in weight accumulating after a balance adjustment might gradually amount to an off-scale deflection of the indicator of microammeter 21. Such off-scale operation can be prevented by a change in the balance adjustment as the indication approaches the end of the indicating scale. When such a re-balance is executed, the amount of weight accounted for in the rebalance by is the difference between readings immediately after rebalance, so that no note need be taken of the changes in position of weights such as item 69 required to achieve the desired rebalance. If the patient is removed from the bed during a series of weight change observations no readings can be taken, of course, while the patient is absent. However, if no change in the balance adjustment nor any change in items contributing to the tare weight upon the scale have been made during the absence of the patient, weight change measurements may be resumed immediately upon return of the patient to the bed mounted upon the scale.

Although the illustrated embodiment employs manually shiftable tare weights, various systems for automatically balancing the scale for maintaining a balanced condition, including systems disclosed in my parent applications, may be employed if the change of weight of a clinical patient is measurable by reason of the utilization of at least some of the features of extreme ruggedness, extreme sensitivity, adequate resistance to drifting, adequate resistance to the prolonged effect of the changes of ambient pressure, humidity, and temperature, and related reliability factors in accordance with the present invention. The electrical indicating means can be modified to display the current rate of weight change instead of the absolute weight, whereby the time of awakening of a sleeping infant may be displayed at a remote location. The metabolism rate is faster for the awakened infant than for the sleeping infant. Instead of using a hospital bed, an innocent-appearing office chair can incorporate the present invention to permit clinical observation of the patient and the measurement of his basal metabolism during an interview without the patient being aware of the measurement.

Flexure pivots for scales have generally assumed that the pivot would permit movement throughout a significant angular range. Bumpers 120 permit the weighing frame to move vertically throughout only a tiny range, most of the weight balancing being achieved by appropriate placement of tare weights 69. Thus the flexure pivots are angularly displaced from their normally vertical alignment by only extremely tiny angles. By this control of the flexible pivots, an extremely small thinness ratio can be attained without loss of ruggedness and ability to withstand shocks thousands of times greater than the sensitivity of the scale. As the sensitivity of the scale is increased, the thinness ratio of supporting columns 91 and suspension plates 97 (usually the 8 plate springs per scale have identical dimensions and spring characteristics) is also increased.

In achieving both sensitivity and ruggedness, the minimizing of frictional drag in the dashpot is quite important. All shocks and impacts having a duration less than a few seconds must be dissipated without transmission of an electrical signal while accurately tuning in to the slight rate of change of weight attributable to the biological processes in the patient. Some of the pioneering results of the present invention are attributable to features of the dashpot, some to the differential transformer utilization, some to the flexure pivots connecting the weighing frame to the base, and some to various combinations of the inventive forward advances.

The thickness ratio of the supporting column 91 and/or suspension plate can advantageously be greater than 15 in some embodiments of the scale, thereby enhancing the sensitivity and achieving other advantages in the flexure pivots. If the thinness ratio is greater than 15, then the vertical distance between the mounted portions of such spring is greater than 15 times the thickness of the spring. In other embodiments of the invention, flexure pivots featuring thinness ratios less than 15 are appropriate. In the modification shown in FIG. 4, the thinness ratio of the suspension plate 97 is significantly greater than the thinness ratio of the supporting column 91. Such combination of thinness ratios permits greater ruggedness of the scale while still achieving high sensitivity. A remarkable sensitivity advantage can be attained if the thinness ratio of the suspension plate is as much as 120% of the thinness ratio of the supporting column, and even greater sensitivity has been achieved by using a suspension plate with a thinness ratio more than 200% of the thinness ratio of the supporting column.

The bumpers 120 restrict the movement of the summation bar 81 to a range not greater than about three times the range of linear response of the differential transformer. The needle of the ammeter can move off the scale when the armature is shifted outside the range of linear response of the transformer.

Numerous variations and modifications of the present invention are possible without departing from the spirit of the appended claims.

What is claimed is:

1. An apparatus for measuring the change of weight of a patient undergoing minutes of clinical observation which apparatus comprises the combination of: a base; a plurality of supporting columns extending upwardly from the base to a plurality of torque tubes, each supporting column having a slenderness ratio greater than 15 to 1, each supporting column serving as a flexure spring between the base and a torque tube; a plurality of torque tubes; a plurality of suspension plates, each having a slenderness ratio greater than 15 to 1, each suspension plate extending downwardly from a torque tube to a support, each plate serving as a substantially vertical flexure spring between a torque tube and a support; a plurality of supports adapted to receive a device for carrying the patient to be weighed; said supports being suspended from said suspension plates extending downwardly from the torque tubes; a plurality of levers extending from torque tubes to a summation bar means, whereby changes in the weight of the patient are transmitted to and converted at the summation bar means into a single rectilinear movement; a transducer adapted to transmit an electrical signal responsive to the magnitude of the rectilinear movement of the summation bar means; restraining means limiting the movement of the supports, levers, and summation bar means to substantially the short range to which the transducer is responsive, said restraining means being sufficiently rugged and strong to protect the apparatus against sudden changes of weight of a magnitude greater than a thousand times the sensitivity of the apparatus; independent tare balancing means for adjusting at zero time the weight prior to the beginning of the measurement of the change of weight with time; and remote indicating means responsive to the electrical signal from the transducer for indicating the change of weight of the patient.

2. A scale for measuring the change of weight of a patient undergoing clinical observation comprising a base; a weighing frame; flexure pivots interconnecting the base and weighing frame; tare balancing means for balancing the scale at the beginning of an observation period; a differential transformer; lever means transmitting change of weight of the patient into relative movement between armature and coils in said differential transformer; and indicator means responsive to the electrical signal from the differential transformer for indicating the thus measured change of weight of the patient.

3. A platform scale characterized by ruggedness sufficient to withstand shock impacts more than 1000 times the sensitivity of the scale comprising the combination of: a rectangular base; a rectangular weighing frame; a pair of normally horizontal torque tubes at opposite sides of the rectangular frames; a plurality of normally vertical supporting columns connecting the base and each torque tube, each supporting column having a thinness ratio greater than 15 to 1; a plurality of normally vertical suspension plates connecting the weighing frame and each torque tube, each suspension plate having a thinness ratio greater than 15 to 1; a pair of normally horizontal lever arms extending from each of the pair of torque tubes to summation means; indicator means actuated by the vertical movement of the summation means; dashpot means damping fluctuations of the indicator means whereby fluctuations of the summation means, lever means, and torque tubes are also at least partially dampened; bumper means on the base and restricting the lever arms from movement outside the range measured by the indicator means, said bumper means being sufficiently rugged to withstand the strains from impact from sudden shifts of loads on the weighing frame and from sudden shifts of torque-balancing means on the lever arms; means for applying a balancing torque to at least one of the lever arms, said supporting columns and suspension plates being sufficiently rugged to retain reliable sensitivity for small weight differences even after the strains caused by the combination of the action of such bumpers and the disbalancing by sudden shifts of loads on the lever arm and weighing frame; means clamping each end of each supporting column sufficiently remotely from the middle flexure zone thereof to impart flexure pivot characteristics to the entire unclamped portion of the supporting column; and means clamping each end of each suspension plate sufficiently remotely from the middle flexure zone thereof to impart flexure pivot characteristics to the entire unclamped portion of the suspension plate.

4. A platform scale in accordance with claim 3 in which the thickness of each of the supporting columns is at least 120% the thickness of each suspension plate, whereby increases sensitivity without impairing ruggedness is achieved.

5. A platform scale in accordance with claim 4 in which the thickness of each of the supporting columns is at least 200% the thickness of each suspension plate.

6. A scale of claim 2 comprising a dashpot for dampening the oscillations of a measuring instrument, a horizontal plate, a central member vertically shiftable and requiring dampening of its vertical oscillations; a pot containing a dampening liquid; a disc immersed in said liquid, the center of said disc being affixed to the central member; a plurality of vertical posts extending upwardly from the vertically shiftable disc; a plurality of vertical posts extending from the horizontal plate; bearing members for associating the plate-mounted posts with corresponding disc mounted posts; pair of flexible strips interconnecting the bearing members with their corresponding disc-mounted posts and plate-mounted posts and whereby vertical alignment of the central member is preserved, said flexible strips being frictionally counterbalanced in pairs so that at each marginal movement of the central member throughout the desired range of vertical movement the greater bending of one flexible strip is frictionally counterbalanced by the unbending of the other flexible strip paired therewith, and whereby the central member is restricted to its central position; and cover means shielding the dashpot components from ambient currents.

7. A scale of claim 2 comprising: means converting the weight force being measured into relative movement between an armature and coils of the differential transformer; a constant voltage transformer energizing the primary of the differential transformer; a pair of rectifying means converting the electrical signals from the differential transformer to direct current; resistance and capacitance shunting the signal from the rectifiers to stabilize the signal to reduce variations attributable to ambient temperature, duration of operation, and related drift-inducing factors; and a milliammeter energized by such stabilized signal to indicate the measurement of said weight.

8. A scale of claim 2 comprising a poise weight adapted for shifting along a rectangular lever arm of a scale while in a partially uplifted position and adapted to be secured in place when exerting its weight, said weight having an opening on its underside for placement and sliding along the lever arm, said opening being significantly closer to one end of the weight, said weight having a hook-like protrusion contacting the bottom of the lever arm, and the diagonally opposite portion of the opening providing a slanting surface adapted to be engaged by an upper edge of the lever arm, whereby, after the weight has been positioned at a particular location along the lever arm, the greater mass adjacent the slanting surface imparts significant upward pressure upon the bottom of the lever arm.

9. A scale for measuring the change of weight of a patient undergoing minutes of clinical observation and adapted to provide reliable measurements throughout the wide temperature range within which the scale is employed and to be resistant to ambient temperature changes which comprises: a frame base; a weighing frame; a plurality of lever arms; an approximately central summation bar actuated by the lever arms; a differential transformer in which relative movement between coils and armature is actuated by the summation bar; dashpot means damping movement of the armature relative to the coils of the differential transformer; bumper means restricting movement of the summation bar within the range not more than about three times the range of linear response of the differential transformer; a torque tube associated with each lever arm; the torque tubes, lever arms, weighing frame, and frame base all having substantially the same thermal expansion properties; and flexure springs associating each torque tube with both the frame base and the weighing frame, the thermal expansion and contraction of the base, frame, lever arms and torque tube being automatically compensating by reason of their substantially symmetrical positions relative to the summation bar, and the mass of the flexure springs being so small relative to the mass of other components that the spring characteristics undergo substantially no change within the temperature range within which the scale is employed.

10. A scale for measuring the change of weight of a patient undergoing minutes of clinical observation, which scale comprises the combination of: a base frame; a weighing frame; a plurality of torque tubes; a plurality of normally vertical flexure springs from each torque tube to the weighing frame and to the base frame; a summation bar; lever arms connecting each torque tube with the summation bar, whereby changes in the weight of the patient are transmitted to and converted at the summation bar into a single vertical movement; a differential transformer comprising coils and an armature, the vertical movement of the summation bar imparting relative movement between the armature and coils; restraining means limiting the movement of the summation bar and lever arms to not more than about three times the range of linear response of the differential transformer; means for adjusting the tare balancing weight for initial time of observations; and indicator means responsive to the electrical signal from the differential transformer for indicating the change of weight of the patient subsequent to such initial time of observation.

11. A scale of claim 2 comprising: uprights in said base adapted to support the frame of a hospital bed during the placement of the hospital bed upon the scale; and retractable supports extensible from the weighing frame, said supports being adapted to be withdrawn during the positioning of the hospital bed upon said uprights, and said supports being adapted to be extended to support the legs of the hospital bed during the weighing of the patient on the hospital bed.

References Cited

UNITED STATES PATENTS

| 2,023,864 | 12/1935 | Walker | 177—227 |
| 3,080,936 | 3/1963 | Sher et al. | 177—210 |
| 3,182,495 | 5/1965 | Johnson | 177—210 XR |

FOREIGN PATENTS

| 1,257,158 | 2/1961 | France. |

ROBERT S. WARD, JR., Primary Examiner.